United States Patent [19]
Pond

[11] Patent Number: 5,136,801
[45] Date of Patent: Aug. 11, 1992

[54] FISHING LURE

[75] Inventor: Robert B. Pond, North Attleboro, Mass.

[73] Assignee: Atom Mfg. Co., Inc., South Attleboro, Mass.

[21] Appl. No.: 709,337

[22] Filed: Jun. 3, 1991

[51] Int. Cl.⁵ .............................................. A01K 85/00
[52] U.S. Cl. .............................. 43/42.39; 43/42.24; 43/42.13
[58] Field of Search ................. 43/42.13, 42.24, 42.39, 43/42.44, 42.37, 42.08, 42.23

[56] References Cited

U.S. PATENT DOCUMENTS

| | | | |
|---|---|---|---|
| 2,989,817 | 6/1961 | Kepler | 43/42.39 |
| 2,994,151 | 8/1961 | Webb | 43/42.37 |
| 3,344,549 | 7/1965 | Peters et al. | 43/42.39 |
| 3,410,020 | 11/1968 | McClellan | 43/42.39 |
| 3,803,747 | 4/1974 | Cartwright | 43/42.44 |
| 3,965,606 | 6/1976 | Bingler | 43/42.39 |
| 4,044,491 | 8/1977 | Potter | 43/42.39 |
| 4,219,956 | 9/1980 | Hedman | 43/42.1 |
| 4,280,296 | 7/1981 | Volenec | 43/44.81 |
| 4,428,144 | 1/1984 | Dickinson | 43/44.96 |
| 4,516,352 | 5/1985 | Firmin | 43/42.26 |
| 4,530,180 | 7/1985 | Gwaldacz, Sr. et al. | 43/42.28 |
| 4,713,907 | 12/1987 | Dudeck | 43/42.39 |
| 4,738,047 | 4/1988 | Ryan | 43/42.25 |
| 4,791,749 | 12/1988 | Stazo | 43/42.29 |
| 4,827,660 | 5/1989 | Dudeck | 43/42.39 |
| 4,835,898 | 6/1989 | Pond | 43/43.16 |
| 4,862,629 | 9/1989 | Ryan | 43/42.25 |
| 4,907,364 | 5/1990 | Hedman | 43/42.39 |
| 4,920,688 | 5/1990 | Devereaux et al. | 43/42.39 |

*Primary Examiner*—Richard K. Seidel
*Assistant Examiner*—Jeanne M. Elpel
*Attorney, Agent, or Firm*—Salter, Michaelson & Benson

[57] ABSTRACT

A fishing lure includes a weighted head portion having a rounded front surface, an artificial grub worm attached to the head portion adjacent the lower end thereof, an attachment eye on the upper end of the head portion for attaching a fishing line thereto, a fish hook attached to the attaching eye and extending angularly downwardly and rearwardly to the grub worm, and a counterweight assembly extending upwardly from the upper end of the head portion. The lure is adapted to be utilized in a fishing technique wherein it is bounced along the bottom of a body of water and it is adapted so that when it comes to rest on the bottom it normally rests on the rounded front surface of the head portion in order to prevent the lure from becoming snagged or caught on debris, or other structures on the bottom.

9 Claims, 2 Drawing Sheets

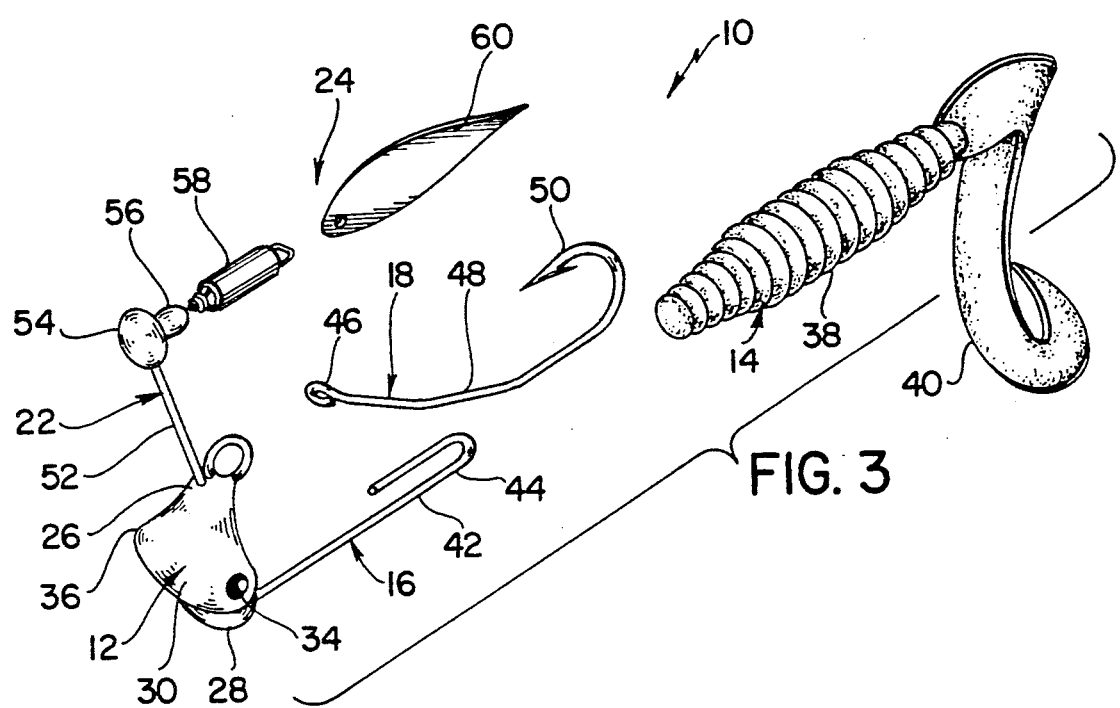

FISHING LURE

BACKGROUND AND SUMMARY OF THE INVENTION

The instant invention relates to fishing tackle, and more particularly to a fishing lure which is adapted to be utilized in a fishing technique wherein it is bounced along the bottom surface of a body of water, such as a bay, estuary, inlet, or other shore area.

It has been found that a fishing technique wherein a fishing lure is bounced along the bottom surface of a body of water can be effective for attracting many types of fish, including striped bass and bluefish. In this regard, it has been found that the sounds and disturbances made by a fishing lure as it is bounced along the bottom can often cause fish to be attracted to lures which might otherwise go unnoticed. However, it has been found that because of the numerous irregularities found along the bottom surfaces of most bodies of water, fishing lures utilized in this technique are frequently lost as a result of becoming snagged or caught on the bottom. Consequently, although the technique of bouncing a fishing lure along the bottom surface of a body of water has been found to be effective for attracting fish, such as striped bass and bluefish, its actual application has been somewhat limited.

The instant invention provides a fishing lure which is specifically adapted for use in a fishing technique wherein it is bounced along the bottom surface of a body of water. More specifically, the instant invention provides an improved fishing lure which is specifically adapted so as to prevent it from becoming caught or snagged on rocks, shells, or debris when it is bounced along the bottom. Still more specifically, the fishing lure of the instant invention comprises a weighted head portion having a front side of preferably substantially rounded configuration and having upper and lower ends, an artificial grub worm, first attachment means for attaching the grub worm to the head portion adjacent the lower end thereof, and second attachment means for attaching a fish hook to the head portion adjacent the upper end thereof so that the fish hook extends angularly downwardly and rearwardly to the grub worm. The second attachment means is also adapted so that it is operative for attaching a fishing line to the head portion, and the shank portion of the fish hook preferably extends through the grub worm so that the hook portion of the fish hook is positioned along the upper side of the grub worm. The first attachment means preferably comprises a wire element which extends rearwardly from the head portion terminating in a hook-like end portion, and the grub worm is received on the wire element and retained by the hook-like end portion. The fishing lure preferably further includes a second wire element which extends upwardly from the upper end of the head portion, and a counterweight element which is secured on the second wire element so that it is positioned in upwardly spaced relation to the head portion. The fishing lure preferably still further includes a spinner element and swivel means for attaching the spinner element to the counterweight element, the spinner element preferably being dimensioned so that it extends approximately to the tip of the hook portion of the fish hook.

For use of the fishing lure of the instant invention the second attaching means at the upper end of the head portion is attached to a fishing line and the lure is slowly pulled through water so that it is bounced along the bottom surface thereof. Because of the rounded configuration of the front surface of the head portion, and the relative positions of the first and second attaching means, the grub worm, and the fish hook, each time the lure comes to rest on the bottom it normally rests on the front surface of the head portion so that the first attaching means, the grub worm, and the hook element extend upwardly from the head portion whenever the lure is at rest. In addition, the counterweight element is provided to further assure that the lure always comes to rest on the front surface of the head portion. In any event, when the lure is again pulled through the water the head portion is immediately jerked upwardly and the grub worm, the first attaching means, and the fish hook are all pivoted downwardly causing the lure to be released from, or bounce over, any obstructions on the bottom. Further, because of the rounded configuration of the front surface of the head portion, the lure is not easily caught on obstacles as it is bounced along the bottom. Still further, because the lure includes a spinner element which extends from the counterweight element to the hook portion of the fish hook, fish which are attracted to the lure are likely to attack the lure in a manner which causes them to be caught on the fish hook, rather than merely attacking the grub worm portion of the lure.

Fishing lures representing the closest prior art to the subject invention of which the applicant is aware are disclosed in the U.S. Pat. No. 4,219,956 to Hedman; U.S. Pat. No. 4,280,296 to Volenec; U.S. Pat. No. 4,428,144 to Dickinson; U.S. Pat. No. 4,516,352 to Firmin; U.S. Pat. No. 4,530,180 to Gwaldacz, Sr.; U.S. Pat. No. 4,713,907 to Dudeck; U.S. Pat. No. 4,738,047 to Ryan; U.S. Pat. No. 4,791,749 to Stazo; U.S. Pat. No. 4,827,660 to Dudeck; U.S. Pat. No. 4,862,629 to Ryan; U.S. Pat. No. 4,907,364 to Hedman; and U.S. Pat. No. 4,920,688 to Devereaux. However, while these references disclose a variety of different types of fishing lures comprising weighted head portions, hook portions, and skirt or body portions, they fail to suggest a lure having the specific structural relationships and features which enable the fishing lure of the instant invention to be effectively utilized in a fishing technique wherein it is bounced along the bottom surface of a body of water without becoming snagged or caught. More specifically, they fail to suggest the structural relationships which cause the fishing lure of the instant invention to come to rest on the front surface of the head portion thereof whenever it is not being advanced along the bottom. Hence, the above references are believed to be of only general interest with respect to the fishing lure of the instant invention.

Accordingly, it is a primary object of the instant invention to provide an effective fishing lure which is adapted for use in a fishing technique wherein it is bounced along the bottom surface of a body of water.

Another object of the instant invention is to provide an effective fishing lure which is adapted to be bounced along the bottom surface of a body of water without becoming snagged.

Another object of the instant invention is to provide a fishing lure comprising a weighted head portion, a grub worm, a fish hook, and first and second attaching means for attaching the grub worm and the fish hook, respectively, to the head portion, wherein the lure is adapted so that the grub worm, the fish hook, and the first attaching means extend upwardly from the head portion when the lure comes to rest on the bottom surface of a body of water.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 3 is an exploded perspective view of the lure.

DESCRIPTION OF THE INVENTION

Figure 1:
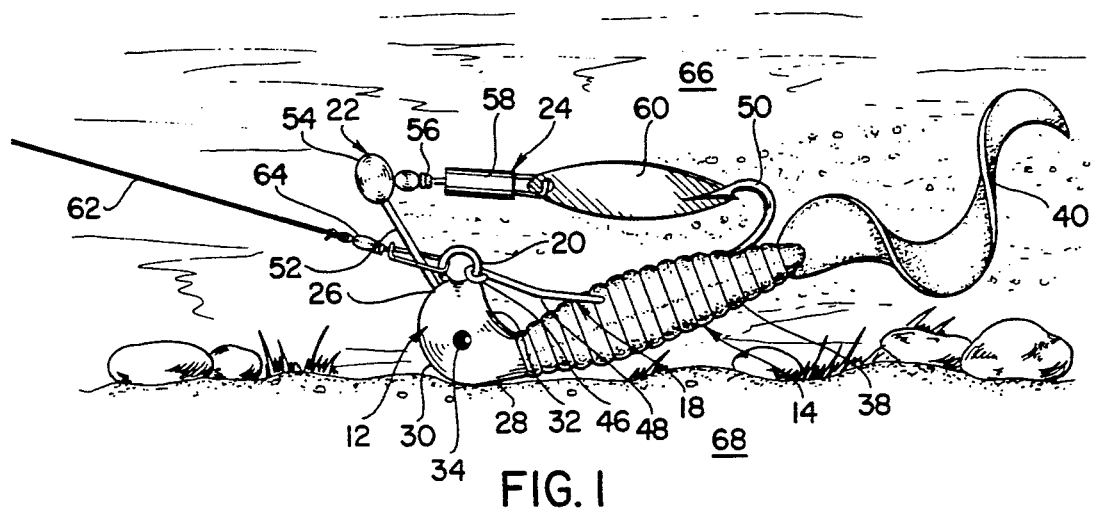
FIG. 1 is a side elevational view of the fishing lure of the instant invention as it is advanced along the bottom surface of a body of water.
Figure 2:
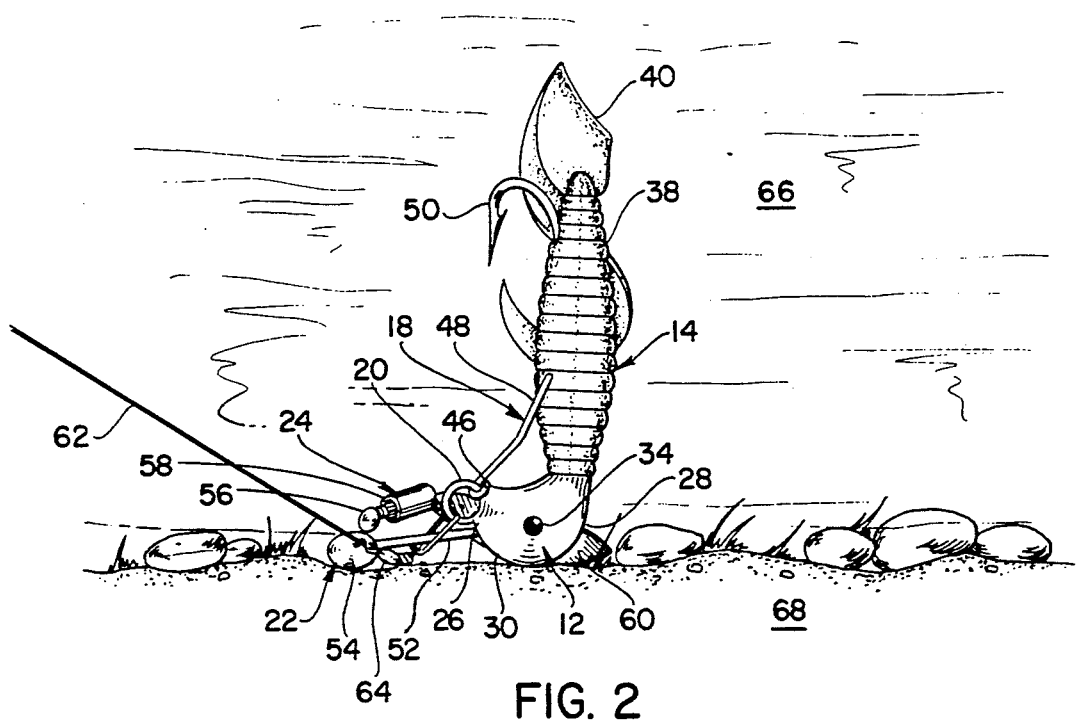
FIG. 2 is a similar view with the lure at rest on the bottom.

Referring now to the drawings, the fishing lure of the instant invention is illustrated and generally indicated at 10 in FIGS. 1 through 3. The fishing lure 10 comprises a head portion generally indicated at 12, a grub worm generally indicated at 14, a first attaching element generally indicated at 16, a fish hook generally indicated at 18, a second attaching element generally indicated at 20, a counterweight assembly generally indicated at 22, and a spinner assembly generally indicated at 24. As illustrated in FIGS. 1 and 2, the grub worm 14, the fish hook 18, and the counterweight assembly 22 are attached to the head portion 12 so that the fish hook 18 and the grub worm 14 extend substantially upwardly from the head portion when the fishing lure 10 comes to rest on the bottom surface of a body of water. The spinner assembly 24 is attached to the counterweight assembly 22 so that it is operative with a spinning action as the fishing lure 10 is moved along the bottom surface of a body of water.

The head portion 12 is preferably molded from a suitable weighted metal, such as lead, and it has upper and lower ends 26 and 28, respectively, and front and rear sides 30 and 32, respectively. The head portion 12 further includes rounded eye portions 34 and 36, which extend outwardly on opposite sides of the head portion 12.

The grub worm 14 is of conventional construction and it is preferably molded from a suitable, flexible, elastomeric plastic material so that it is operative with a realistic swimming action as it is drawn through the water as part of the lure 10. The grub worm 14 comprises a body portion 38 and a tail portion 40 which extends rearwardly from the body portion 38.

The first attaching element 16 is preferably made from a corrosion resistant metal, such as stainless steel, and it includes a main portion which is preferably molded into the head portion 12, and a hook-like end portion 44. The first attaching element 16 is attached to the head portion 12 so that it extends rearwardly therefrom adjacent the lower end 28.

The fish hook 18 preferably comprises a fish hook of the type disclosed in the applicant's U.S. Pat. No. 4,835,898, although alternatively, various other types of fish hooks can be utilized in the lure 10. In any event, the fish hook 18 comprises an attaching eye 46, a shank portion 48, and a hook portion 50, and it is adapted to be assembled in the lure 10 in the manner illustrated in FIGS. 1 and 2. Specifically, the fish hook 18 is adapted to be attached to the head portion 12 so that the attaching eye 46 is received on the second attachment element 20, and so that the shank portion 48 extends angularly downwardly and rearwardly to the grub worm 14. The fish hook 18 is preferably assembled so that the shank portion 48 extends through the grub worm 14, and so that the pointed tip of the hook portion 50 is spaced upwardly from the upper side of the body portion 38 as illustrated in FIGS. 1 and 2.

The second attachment element 20 comprises a ring-like member which is preferably made from a suitable corrosion resistant metal, such as stainless steel, and it is preferably molded into the head portion 12 so that it is located adjacent the upper end 26 thereof. The second attachment element 20 is operative for attaching the attaching eye 46 of the hook element 18 to the head portion 12 adjacent the upper end 26 thereof. Further, the second attachment element 20 is formed so that it is sufficiently large to accommodate a snap swivel, or the like, for attaching the fishing lure 10 to a fishing line.

The counterweight assembly 22 comprises a wire element 52, and a counterweight element 54 on the wire element 52. The wire element 52 is preferably made from a corrosion resistant metal, such as stainless steel, and it extends upwardly from the upper end 26 of the head portion 12. The wire element 52 is positioned adjacent the second attachment element 20 to enable a snap swivel to be attached to the lure 10 so that the snap swivel extends around both the wire of the attachment element 20 and the wire element 52 as illustrated in FIGS. 1 and 2. This assures that a fishing line attached to the snap swivel always pulls the lure 10 from a proper angle as it is pulled upwardly from the position illustrated in FIG. 2. The counterweight element is preferably made from a suitable weighted metal, such as lead, and it is positioned in upwardly spaced relation to the head portion 12. The counterweight element 54 is positioned so that it is operative for assuring that the head portion 12 rests on the front surface 30 thereof, as illustrated in FIG. 2, whenever the lure 10 is allowed to rest on a supporting surface. However, as illustrated in FIG. 1, when the lure 10 is pulled through the water the counterweight assembly 22 normally extends upwardly from the head portion 12.

The spinner assembly 24 comprises a snap swivel element 56, a tubular sleeve 58 on the snap swivel element 56, and a spinner element 60. The snap swivel element 56 is of conventional construction and it is preferably molded into the counterweight element 54 in order to permanently attach it thereto. The sleeve 58 comprises a tubular sleeve which is received on the snap swivel element 56 in order to maintain the snap swivel element 56 in a generally rearwardly extending orientation. The spinner element 60 is preferably made from a suitable shiny corrosion resistant sheet metal, such as polished sheet stainless steel, and it is preferably formed in an axially twisted or helical configuration so that it spins about a longitudinal axis rather than merely laying against the grub worm 14 as the lure 10 as is advanced through the water. The spinner element 60 is attached to the counterweight element 54 with the snap swivel element 56 so that it can spin substantially freely relative to the counterweight element 54 as the lure 10 is advanced through the water. Further, as illustrated in FIG. 1, the spinner assembly 24 is dimensioned so that the spinner element 60 extends approximately to the tip of the hook portion 50 but not significantly therebeyond so that the spinner element 60 spins about the pointed tip of the hook portion 50 as the lure 10 is advanced through the water.

For use and operation of the fishing lure 10, the second attaching element 20 is attached to a fishing line 62 with a snap swivel 64 so that the snap swivel 64 extends through the second attachment element 2 and around the wire element 52, and the lure 10 is drawn through a body of water 66 so that it bounces along the bottom surface 68 thereof. In this regard, the lure 10 is preferably either drawn through the water 66 by trailing it behind a boat, or by casting and retrieving the lure 10 in a conventional manner. In either case, the lure 10 is preferably bounced along the bottom 68 so that it is advanced forwardly in an irregular bouncing pattern. As the lure 10 is advanced along the bottom 68 in this manner, the rounded front surface 30 engages any obstructions encountered by the lure 10. Further, when the lure 10 comes to rest on the bottom 68, it normally rests on the front surface 30 thereof in the manner illustrated in FIG. 2 so that the fish hook 18, the grub worm 14, and the first attaching element 16 extend upwardly from the head portion 12. However, because of the orientation of the second attaching element 20 on the head portion 12 relative to the first attaching element 16, the fish hook 18, and the grub worm 14, and because the snap swivel 64 is attached to the lure 10 so that it extends through the second attachment element and around the wire element 20, the lure 10 is automatically pivoted upwardly into a substantially horizontal swimming position wherein the fish hook 18 and the grub worm 14 trail behind the head portion 12 when the lure 10 is thereafter pulled forwardly with the fishing line 62. Further, when the lure 10 is in a substantially horizontal swimming position, the spinner assembly 24 extends rearwardly in a generally horizontal disposition so that the spinner element 60 rotates adjacent the pointed tip of the hook portion 50. As the lure 10 is advanced through the water 66 in this manner, the rounded configuration of the head portion 12 normally prevents the lure 10 from becoming fouled, or caught on objects or other surface irregularities on the bottom 68. Further, when the lure 10 is allowed to rest on the bottom 68, it is automatically moved to a position wherein the hook element 18 and the grub worm 14 extend upwardly in the manner illustrated in FIG. 2 so that they are less likely to become snagged. Further, when the lure 10 is thereafter again pulled through the water, the pivoting motion of the lure 10 as the hook element 18 and the grub worm 14 are pivoted downwardly and rearwardly normally causes the lure 10 to become dislodged from any obstructions on the bottom 68. Still further, as the lure 10 is advanced through the water 66, the spinning action of the spinner element 60 adjacent the hook portion 50 of the hook element 18 attracts fish so that they normally attack the lure 10 adjacent the hook portion 50 and become hooked thereon, rather than merely attacking the tail portion 40 of the grub worm 14.

It is seen therefore, that the instant invention provides an effective fishing lure which is adapted for use in a fishing technique wherein it is bounced along the bottom of a body of water. The lure 10 is constructed so that it can normally be bounced along the bottom 68 without becoming caught or snagged on objects or surface irregularities. Further, the lure 10 is adapted to maximize the fish hooking ability thereof with the spinner element 60. Accordingly, it is seen that the fishing lure of the instant invention represents a significant advancement in the art relating to fishing tackle which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A fishing lure comprising:
 a) a weighted head portion having upper and lower ends;
 b) an artificial grub worm;
 c) first attachment means extending rearwardly from said head portion adjacent the lower end thereof for attaching said grub worm thereto;
 d) a fish hook including a shank portion, an attachment eye on one end of said shank portion, and a hook portion on the opposite end of said shank portion;
 e) second attachment means on said head portion at substantially the upper end thereof, said second attachment means interengaging said attachment eye for attaching said fish hook to said head portion at substantially the upper end of said head portion, said second attachment means being further operative for attaching said head portion to a fishing line at substantially the upper end of said head portion; and
 f) said shank portion extending angularly downwardly and rearwardly from the upper end of said head portion to said grub worm, said shank portion passing through said grub worm, said hook portion being exposed adjacent said grub worm.

2. In the fishing lure of claim 1, the front side of said head portion being of rounded configuration.

3. In the fishing lure of claim 1, said first attachment means comprising a wire element extending rearwardly from said head portion terminating in a hook-like end portion, said grub worm being received on said wire element and being retained thereon by said hook-like end portion.

4. The fishing lure of claim 1, further comprising counterweight means on said head portion for biasing said lure to a position wherein said first attaching means, said grub worm, and said fish hook extend upwardly from said head portion when said head portion is received on a supporting surface.

5. In the fishing lure of claim 4, said counterweight means comprising a counterweight element, and counterweight mounting means mounting said counterweight element so that it is positioned in upwardly spaced relation to said head portion when said head portion is positioned in a substantially horizontal swimming position wherein the upper end thereof defines the uppermost extremity of said head portion.

6. In the fishing lure of claim 1, said fish hook being oriented such that said hook portion extends upwardly from said grub worm when said head portion is positioned in a substantially horizontal swimming position wherein the upper end thereof defines the uppermost extremity of said head portion.

7. The fishing lure of claim 5, further comprising a spinner element and swivel means attaching said spinner element to said counterweight element so that said spinner element is freely rotatable relative to said counterweight element.

8. In the fishing lure of claim 7, said spinner element being dimensioned to extend approximately to said hook portion but not significantly therebeyond.

9. In the fishing lure of claim 7, said spinner element comprising a helically twisted spinner element.

* * * * *